Feb. 10, 1970 G. L. HURST 3,495,268

CONTINUOUSLY MOVING ENDLESS BAND NON-IMPACT TRANSFER PRINTER

Filed March 15, 1966

INVENTOR
GILCHRIST L. HURST

BY Sughrue, Rothwell, Mion, Zinn & Macpeak
ATTORNEYS

United States Patent Office 3,495,268
Patented Feb. 10, 1970

3,495,268

CONTINUOUSLY MOVING ENDLESS BAND NON-IMPACT TRANSFER PRINTER

Gilchrist L. Hurst, Boston, Mass., assignor, by mesne assignments, to Mohawk Data Sciences Corporation, East Herkimer, N.Y., a corporation of New York Filed Mar. 15, 1966, Ser. No. 534,475
Int. Cl. G01d 15/06
U.S. Cl. 346—74 7 Claims

ABSTRACT OF THE DISCLOSURE

A non-impact image transfer magnetic printer utilizes an endless band of magnetic recording material on which an image is recorded, developing medium is applied and then the image is transferred from the band to a suitable image receiving mechanism. The endless band of recording medium is driven such that it continuously moves past the recording area but is intermittently stopped for printout. This is accomplished by having vacuum columns for retaining the portion of the band as required on each side of the recording area.

Figures 1, 2:
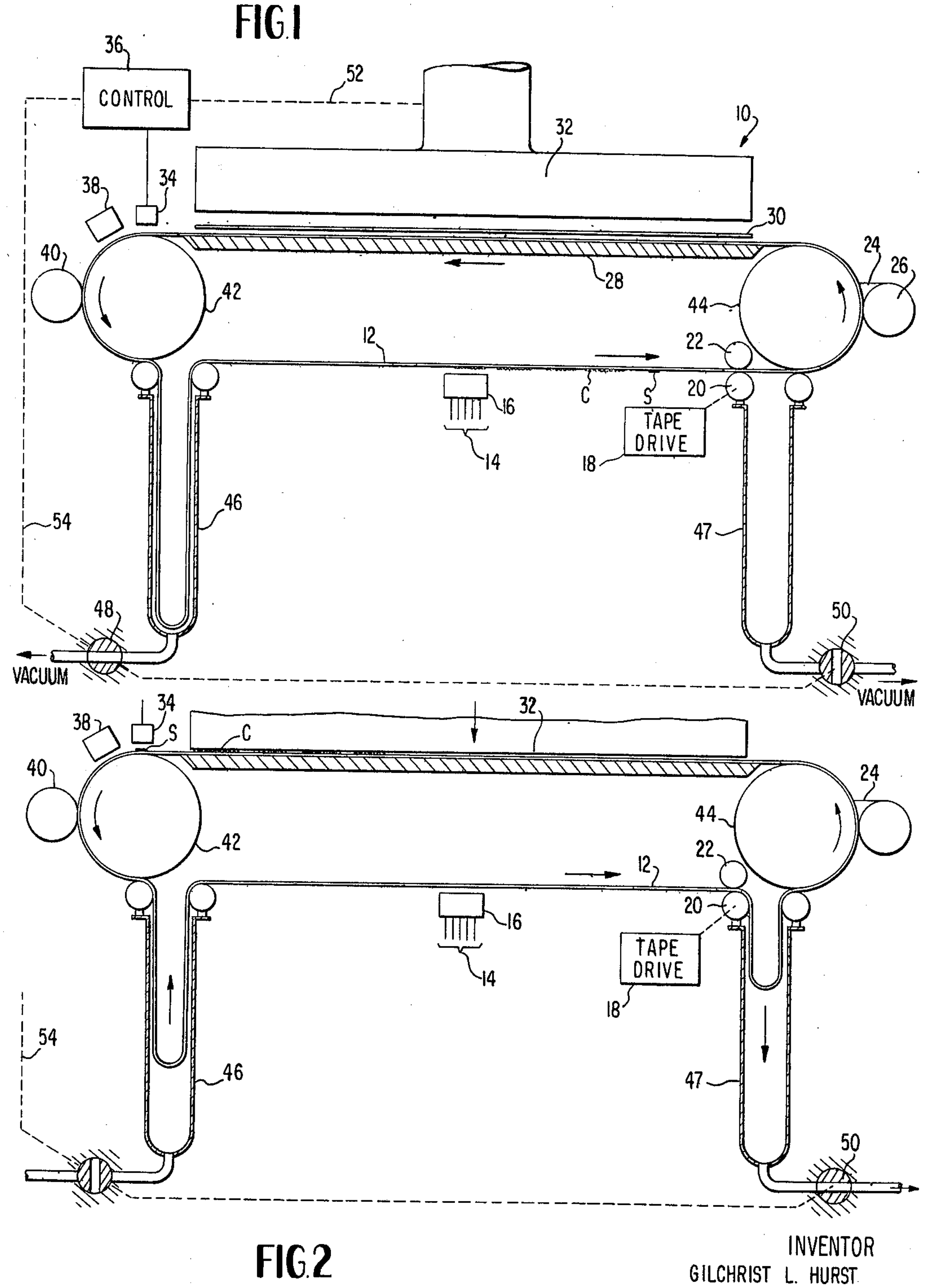

This invention relates to improvements in printers and is particularly applicable to printers of the non-impact image transfer type such as magnetic or electrostatic printers.

Although this invention is equally applicable to magnetic or electrostatic printers and other printers utilizing a movable image carrying medium, it will be described with reference to magnetic printers for the sake of clarity and brevity.

In the present non-impact image transfer magnetic printers, it is known to selectively magnetize a portion of a moving image carrier, magnetizable medium such as a belt or drum, then to apply magnetic ink to the magnetized areas and finally to transfer this ink from the developed image areas to the paper or other suitable transfer medium. However, the entire operation of magnetizing the image carrier and transferring the developed image to the paper is either substantially continuous or wholly intermittent. This presents problems where the information to be printed is received serially and continuously and it is desired to print intermittently, e.g., a line at a time. With a continuously operable printer the image carrier is continuously moving to keep up with incoming print information and it is impossible to intermittently print a line at a time. With a wholly intermittent printer the incoming print information has to be interrupted to allow the printout. This invention provides a unique arrangement of a non-impact image transfer printer wherein incoming signals can be recorded continuously on a movable flexible image carrier and, by the unique arrangement of this invention, can be intermittently printed out a line at a time, simultaneously with continuously receiving input information, and without adverse effects on the character and quality of the printing.

Other objects of the invention will be pointed out in the following description and claims and illustrated in the accompanying drawings, which disclose by way of example, the principle of the invention and the best mode which has been contemplated of applying that principle.

In the drawings:

FIG. 1 is a schematic view illustrating the principal features of this invention; and FIG. 2 is a view similar to FIG. 1 illustrating the operation of the printer of this invention.

Referring to the drawing, a non-impact image transfer printer 10 will be described as a magnetic printer although it is apparent that the principles are equally applicable to other types of non-impact image transfer printers, e.g., electrostatic printers. The printer includes an endless flexible image recording and carrying medium such as a band 12 which may be of magnetic tape or the like. Printer input signals over lines 14 control a band image energizing means and may include a mirror image magnetic writing matrix 16 and sync track recorder. The magnetic tape 12 is continuously driven in short incremental steps by tape drive 18 connected to drive roller 20 with backing roller 22 so that the tape may continuously move in short incremental steps past the writing matrix 16 and therefore signals which are continuously and serially received on lines 14 can be recorded next to each other on the band 12.

A developing medium 24 which may be magnetic ink is applied to the recorded image by any suitable ink applying means such as roller 26 of thirsty rubber. Although the ink would probably be liquid in the preferred embodiment, any suitable known developer such as a magnetic ink powder applied and later removed by conventionally known means would be within the scope of this invention.

The band 12 moving in the direction of the arrows passes over the platen 28 and under a paper or like transfer medium 30. A pusher 32 is provided for pushing the paper 30 into contact with the band 12 backed up by platen 28 to transfer the magnetic ink image from tape 12 to the paper 30. The paper 30 may be normally held out of contact with the band 12 by any suitable means and may be spaced a line at a time by known line spacers, not shown.

Following the image transfer station, which includes the platen 28, pusher 32 and transfer medium 30, and in the direction of travel of the band or magnetic tape 12, there is a reader 34 for reading the sync signal recorded on the tape. The sync reader 34 feeds its sync signal into a control 36.

A demagnetizing head 38 of usual construction and suitable ink wipe-off means such as roller 40 of thirsty rubber follow the reader in the path of travel of band 12.

The magnetic tape driven by the tape drive 18 is guided at its ends by suitable idling guide rolls 42 and 44.

The essence of the invention is to provide means for driving and controlling movement of the belt so that the portion of the belt 12 adjacent the writing head 16 is continuously moving (in short increments for character printing) while the portion of the belt adjacent the transfer station and the paper 30 is intermittently stopped to enable printout by operating the pusher 32 to transfer the image to the paper 30 from the belt 12. Means for allowing this continuous movement of one run of the endless band for input recording and intermittent movement of the other run of the endless band for printout includes, in the preferred embodiment, a pair of vacuum columns 46 and 47 to which vacuum is selectively applied under the control of valves 48 and 50. Control 36 includes a control command link to control operation of the pusher 32 and another command link to control synchronous operation of the valves 48 and 50. The vacuum columns 46 and 47 allow the band 12 to function as physical time delay or storage so that during printout incoming print signals can still be recorded but the portion of the tape between recording and printout is physically stored in vacuum column 47. The vacum columns 46 and 47 are on both sides of the recording station writing head 16, and column 47 precedes the ink applying roller 26 so that it will not interfere with the developed image.

The operation of the invention will now be described. Incoming signals received by the writing matrix 16 from incoming lines 14 are recorded on the band 12 as is a sync signal *s*. Of course, these recordings cannot be shown but to illustrate the invention the sync signal is recorded at *s* for example and the characters follow it and are recorded continuously at *c*, for example. The drive 18 continuously inches the band 12 in short increments so that each character is recorded on a different portion of the band. The band continues to move and at the time the sync signal *s* is detected by the sync reader 34 the control 36 operates to effectively stop movement of the band 12 above platen 28. This is accomplished by reversing the valves 48 and 50 from that shown in FIG. 1 to that shown in FIG. 2. The tape drive 18 can then pull the stored loop portion of the tape from out of its storage in vacuum column 46 while storing it up in vacuum column 47, allowing continuous input. Simultaneously, the command 36 operates via command link 52 to cause the pusher 32 to print. In this manner an entire line at a time may be printed on the paper 30 and the incoming signals may be received continuously. During the time taken for printout vacuum column 47 accumulates a loop of tape 12 bearing the continuously received input signals recorded thereon. When printout valves 48 and 50 are switched back to the position shown in FIG. 1 via command link 54, the band 12 is then caused to move around idler 42 at a speed faster than the band is driven by tape drive 18 to thereby accumulate the demagnetized and clean tape as a loop in vacuum column 46 even as the writing matrix is continuously recording. This is effect transfers the stored loop from vacuum column 47 to vacuum column 46 in preparation for another printout operation.

While the invention has been particularly shown and described with reference to a preferred embodiment thereof, it will be understood by those skilled in the art that various changes in form and details may be made therein without departing from the spirit and scope of the invention.

What is claimed is:

1. In a non-impact image transfer printer of a type including a movable recording medium in the form of an endless band of a material capable of being energized and holding an image, band energizing image forming means adjacent the band for selectively recording a desired image on it, means also adjacent the band for applying developing medium to develop the recorded image, and an image transfer medium adjacent the band for receiving the image formed by the medium, the improvements in such a printer comprising, means driving and controlling movement of the band so that a portion of the band adjacent the band energizing image forming means moves continuously and the movement of another portion of the band adjacent the image transfer medium is intermittently stopped, and means responsive to said movement controlling means for moving the image transfer medium into contact with the band each time the movement of the band is stopped.

2. A printer as defined in claim 1 wherein the driving and controlling means include vacuum columns spaced apart at both sides of the band energizing image forming means.

3. A printer as in claim 2 wherein one of the vacuum columns precedes the means for applying the developing medium in the direction of movement of the band.

4. A printer as in claim 1 wherein intermittent stopping of the band by the driving and control means adjacent the image transfer medium is controlled by a signal recorded on the band, and a signal reader for detecting this signal.

5. A printer as in claim 4 wherein the means for driving and controlling the movement of the band further includes a control which receives control signals from the signal reader.

6. A printer as defined in claim 1 wherein the band is a magnetizable band, the developing medium is a ferromagnetic ink, and the band image recording means is a magnetic head.

7. A printer as defined in claim 1 wherein the means for driving and controlling movement of the band includes means for selectively physically storing portions of the endless band on both sides of the band recording means.

References Cited

UNITED STATES PATENTS

| | | | |
|---|---|---|---|
| 3,176,894 | 4/1965 | Schoeneman | 226—97 |
| 3,254,626 | 6/1966 | Uemura | 346—74 |
| 3,216,348 | 11/1965 | Oldenburg | 101—93 |

BERNARD KONICK, Primary Examiner

JOSEPH F. BREIMAYER, Assistant Examiner

U.S. Cl. X.R.

101—1; 226—97, 117